Feb. 28, 1961  R. H. BODMAN  2,972,857
BOX TYPE TENSION CHAIN FOR PROTECTING ELECTRIC CABLE
Filed Jan. 10, 1956  2 Sheets-Sheet 1

INVENTOR.
RALPH H. BODMAN
BY George Sipkin
Lee I. Huntzberger
ATTORNEYS

INVENTOR.
RALPH H. BODMAN
BY George Sipkin
Lee D. Huntzberger
ATTORNEYS

United States Patent Office 2,972,857
Patented Feb. 28, 1961

2,972,857

BOX TYPE TENSION CHAIN FOR PROTECTING ELECTRIC CABLE

Ralph H. Bodman, Woods Hole, Mass., assignor, by mesne assignments, to the United States of America as represented by the Secretary of the Navy Filed Jan. 10, 1956, Ser. No. 558,393

6 Claims. (Cl. 59—78.1)

This invention relates to a box-type chain, and more particularly, to a chain employing a box-shaped link constructed of rectangular tubing.

The chain contemplated by this invention is used to suspend, raise, lower, and/or tow various devices requiring electrical connection between the device and the opposite end of the chain. This box-type construction allows the chain to be flexible, without stretching or chafing the electric cable, when the chain is wound on a storage drum, passed over a sheave or pulley, or bent in a curve as can be the case when the chain is used to tow an object through the water or air or over rough terrain. The box-type construction of the chain protects the electric cable from other types of injury such as striking objects or abrasion due to chafing. The chain suspends devices without inducing tension on the electric cable. The chain is capable of transmitting torque thus maintaining any orientation of a suspended object.

It is therefore an object of this invention to provide a chain which is adapted to allow a cable, such as an electric cable, to be passed through the centerline thereof.

It is a further object of this invention to provide a chain having a box-type construction which allows the chain to be flexed without stretching or chafing an electric cable passed therethrough.

It is a still further object of this invention to provide a chain which may be used to suspend an electric device and allow an electric cable to run therethrough to the electric device without inducing tension on the electric cable.

It is a still further object of this invention to provide a chain which protects an electric cable running therethrough from injury caused by striking objects or abrasion due to chafing.

It is a still further object of this invention to provide a chain capable of transmitting torque to thereby maintain any orientation of an object suspended from the chain.

Figure 1:
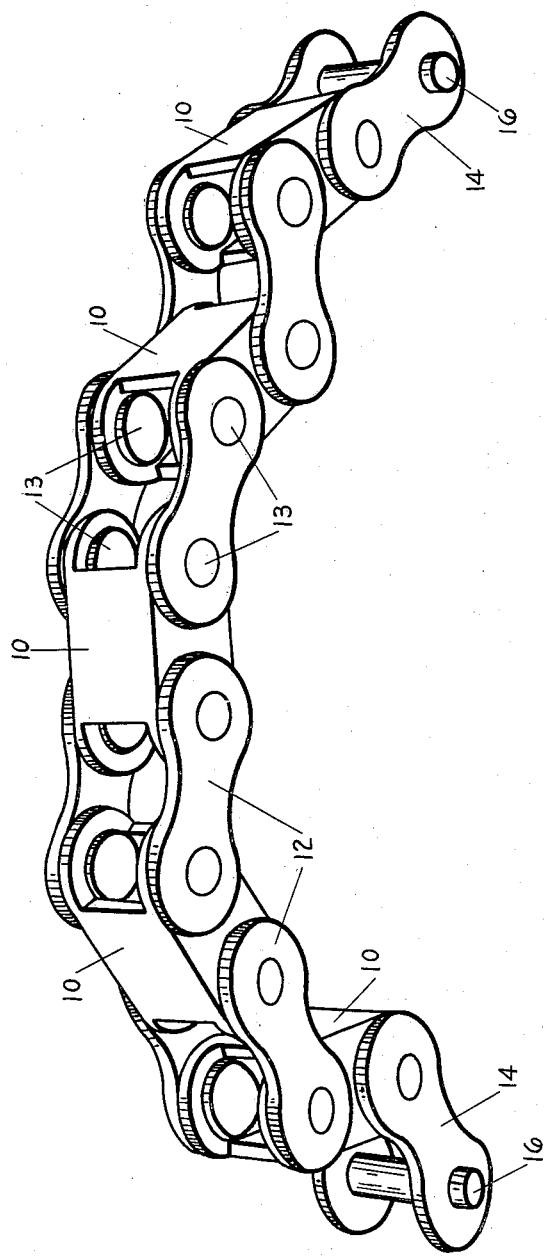
Figure 2:
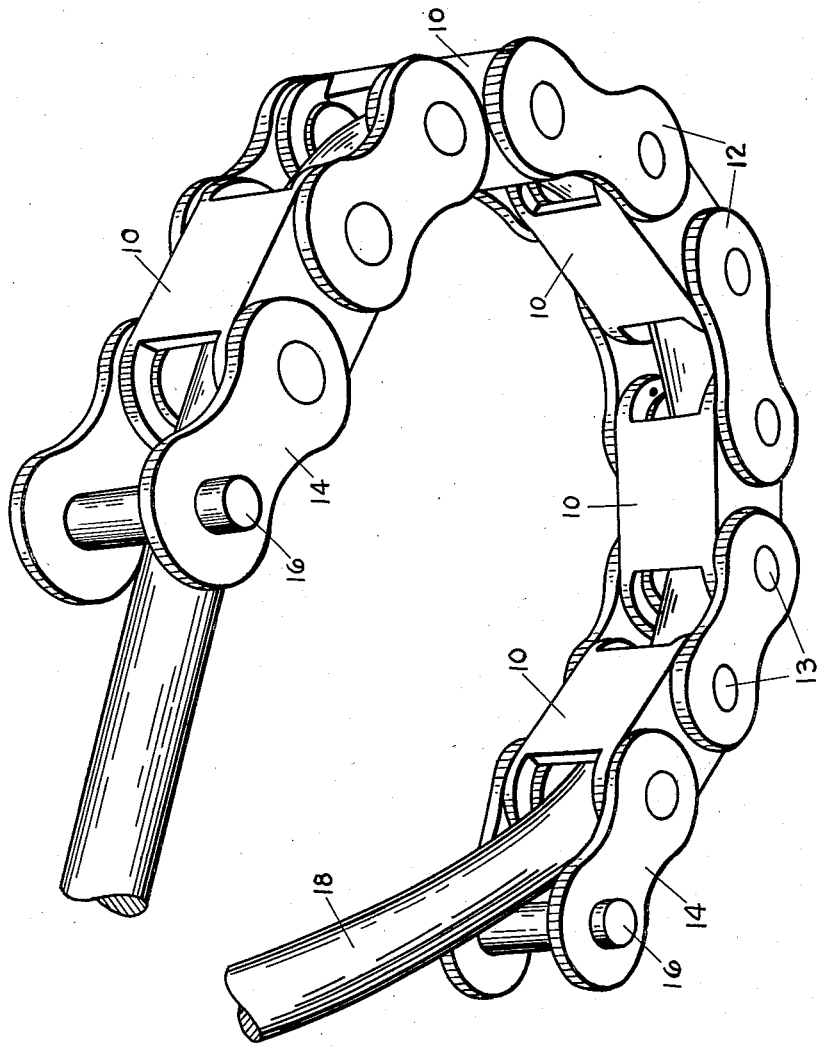

Other objects and many of the attendant advantages of this invention will be readily appreciated as the same becomes better understood by reference to the following detailed description when considered in connections with the accompanying drawings wherein:

Fig. 1 is a perspective drawing of a chain constructed in accordance with the principles of this invention, and Fig. 2 is a perspective drawing of the chain shown in Fig. 1, together with an electric cable passing through the centerline thereof.

Referring now to the drawings, the chain consists of a plurality of box-shaped links 10 constructed of rectangular tubing. Box-shaped links 10 are longitudinally separated from each other by a given distance, as shown. Every two adjacent box-shaped links are interconnected by means of a pair of parallel flat-plate links 12. Flat-plate links 12 are oriented as shown, and are rotatably coupled to box-shaped links 10 by coupling means 13 which, as shown, pass solely through each end of each flat-plate link and that end of the side of the box-shaped link with which it is in contact.

The sides of box-shaped links 10 which are in contact with flat-plate links 12 include substantially semicircular projections on the ends thereof. These projections extend beyond the corresponding ends of the pair of opposite sides of box-shaped links 10, which are not in contact with flat-plate links 12.

The chain is terminated by additional parallel pairs of flate-plate links 14, which are similar to flat-plate links 12. Each pair of flat-plate links 14 have the terminating ends thereof coupled together by means of a rod 16, as shown.

Fig. 2 illustrates an electric cable 18 which has been passed through the centerline of the chain.

Obviously many modifications and variations of the present invention are possible in the light of the above teachings. It is therefore to be understood that within the scope of the appended claims the invention may be practiced otherwise than as specifically described.

I claim:

1. A box type chain comprising a plurality of separate sections of tubing, each rectangular in transverse cross section, the top and bottom walls of each section terminating at each end substantially shorter than the side walls, and the ends of the side walls being semicircular and convex, said sections being arranged end to end but in spaced relation to one another and plate like links having their ends of widths approximately equal to the widths of the side walls and arcuately convex and semicircular, disposed one against each side wall of a section and overlapping with the adjacent semicircular ends of two tube sections that are in end to end relation, each overlapping side of a tube and link being pivoted together by a pin individual to each link end and the side wall which it overruns, and all pins separate from one another, leaving a continuous internal passage lengthwise of the chain unobstructed by said pins through which a cable may be threaded.

2. A box type chain comprising a plurality of separate sections of tubing, each rectangular in transverse cross section, the top and bottom walls of each section terminating at each end substantially shorter than the side walls, and the ends of the side walls being semicircular and convex, said sections being arranged end to end but in spaced relation to one another, plate like links having their ends of widths approximately equal to the widths of the side walls, and arcuately convex and semicircular, disposed one against each side wall of a section and overlapping with the adjacent semicircular ends of two tube sections that are in end to end relation and overrunning with the ends of the top and bottom walls, said overlapping ends of the links and sections being pivoted together by pins individual to and that extend only through each link end and the side wall which it overruns, and all separate from one another, leaving a continuous internal passage lengthwise of the chain and an electric cable threaded through the chain in a direction lengthwise of the chain, in the spaces between the links and through the tubular sections.

3. The chain as set forth in claim 1, and each end of the chain terminating in a pair of said links, the free ends of each pair such terminal links being connected by a pin which extends through both links of that pair.

4. A box type chain comprising a plurality of separate sections of tubing, each rectangular in transverse cross section, the top and bottom walls of each section terminating at each end substantially shorter than the side walls, the end edges of the side walls of each section being arcuate and convex, the sections being disposed in an end to end relation but spaced apart, and a pair of plate-like links pivotally connecting adjacent end portions of said sections, said links each being applied against a face of the side wall of a section end and individually pivoted thereto separately from the pivotal connection of the other link of that pair to the opposite side wall of the same end of said section, leaving open the space between the links, through which and the tube sections a cable may be passed in succession for a plurality of connected links and tube sections.

5. The chain as set forth in claim 4, and an electric cable threaded through a substantial portion of the chain in a direction lengthwise of the chain and through successive tube sections.

6. The chain as set forth in claim 4, and the chain terminating at at least one end in a pair of said links, the free ends of each pair of said terminal links being connected together by a pin which passes between both links of that pair.

References Cited in the file of this patent

UNITED STATES PATENTS 2,600,887    Lannen  ----------------- June 17, 1952

FOREIGN PATENTS 470,412    Great Britain ----------- Aug. 16, 1937